Figure 1:
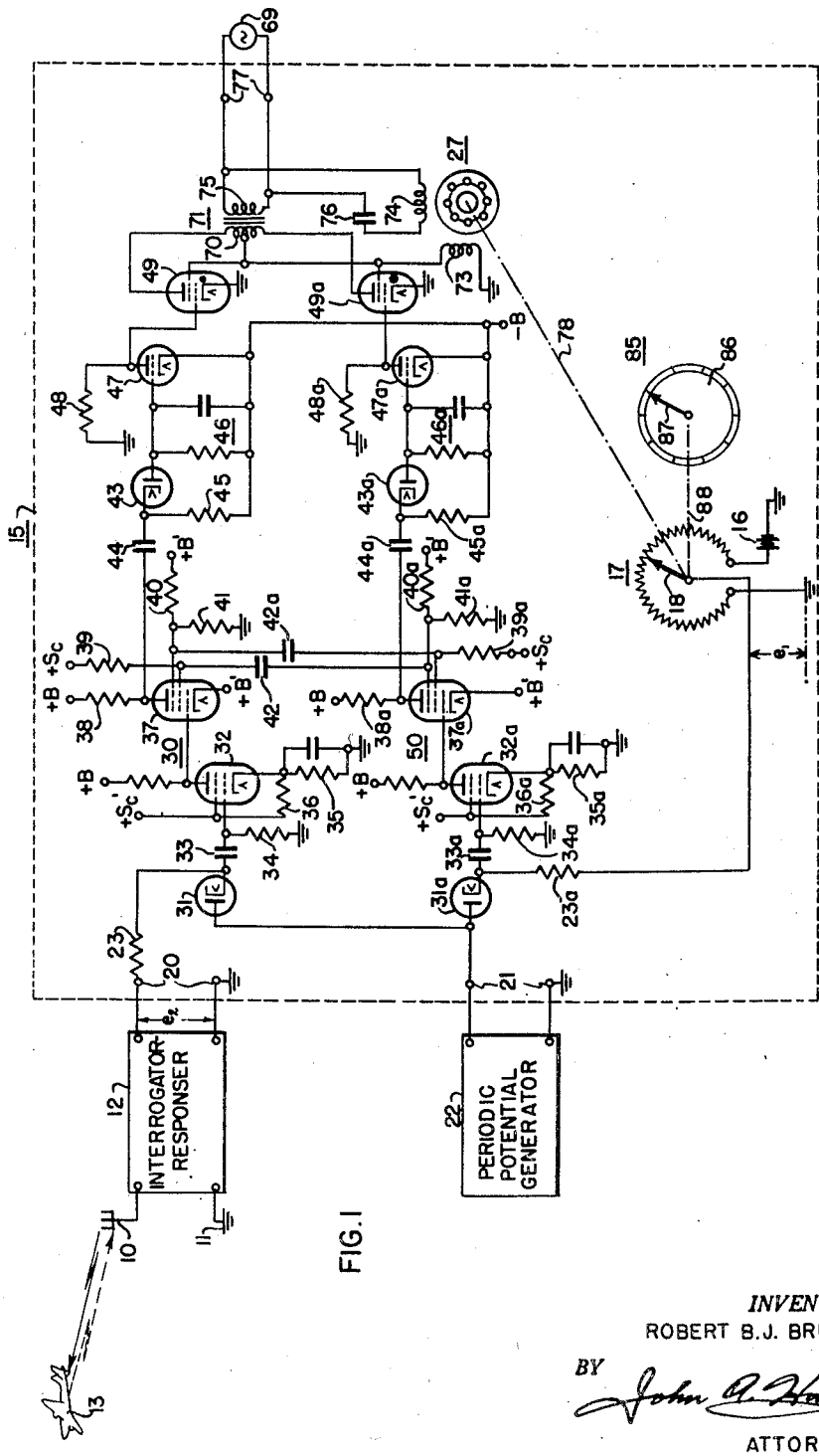

March 28, 1950     R. B. J. BRUNN     2,502,308
ANTIHUNTING ELECTRICAL CONTROL SYSTEM
Filed July 11, 1947     2 Sheets-Sheet 1

*INVENTOR.*
ROBERT B.J. BRUNN
BY John A. Harvey
ATTORNEY

March 28, 1950

R. B. J. BRUNN 2,502,308

ANTIHUNTING ELECTRICAL CONTROL SYSTEM

Filed July 11, 1947

2 Sheets-Sheet 2

INVENTOR.
ROBERT B.J. BRUNN

BY John A. Harvey

ATTORNEY

Patented Mar. 28, 1950

2,502,308

UNITED STATES PATENT OFFICE 2,502,308

ANTIHUNTING ELECTRICAL CONTROL SYSTEM

Robert B. J. Brunn, Manhasset, N. Y., assignor to Hazeltine Research, Inc., Chicago, Ill., a corporation of Illinois Application July 11, 1947, Serial No. 760,361

2 Claims. (Cl. 318—28)

This invention relates to control systems and, particularly, to control systems for adjusting the magnitude of a first electrical effect toward or to equality with that of a second electrical effect. The present invention represents improvements in control systems of the type disclosed and claimed in the copending application of Charles J. Hirsch, Serial No. 760,204, filed concurrently herewith, entitled "Control system," and assigned to the same assignee as the present invention.

The control system of the above-mentioned copending application derives a series of pulses of energy in response to the difference between the magnitude of at least one of a first and a second potential and that of a third potential and utilizes these pulses of energy so to control a motor-driven potentiometer as to adjust the magnitude of the first potential toward equality with that of the second potential. Each such derived pulse of the series has an energy content which is substantially equal to that of every other pulse and consequently causes the motor to develop in response to each thereof a force equal to that developed for every other pulse. Accordingly, the motor drives the potentiometer with a driving force which does not vary whether the aforesaid difference between the magnitudes of the two potentials is large or small.

It would be desirable in such control systems that each of the intermittent pulses of energy applied to the motor have a value proportional to the difference between the two potentials which are being adjusted to equality. Then when the last-mentioned potential difference was great, the energy content of the individual pulses would be large and the over-all adjusting force developed by the motor in response to these pulses would also be large. This desirable arrangement would permit the motor-driven potentiometer initially to reduce at a fast rate the potential difference between the two potentials which are being adjusted to equality, yet as this potential difference was reduced the adjusting force would be correspondingly diminished. Hence, when the two potentials were nearly equal, the adjusting force would be desirably low and overtravel of the motor-driven potentiometer, with consequent hunting thereof, would be largely avoided.

It is an object of the present invention, therefore, to provide a new and improved control system of the type described and one which is capable of providing a quick and accurate adjustment of the magnitude of a first electrical effect toward equality with that of a second electrical effect.

It is another object of the invention to provide a new and improved control system adapted to adjust the magnitude of a first electrical effect toward equality with that of a second electrical effect and one which develops for this purpose an adjusting force of value proportional to the difference between the values of the aforesaid effects.

It is a further object of the invention to provide a new and improved motor-driven control system, for adjusting the magnitude of a first electrical effect to equality with that of a second electrical effect, which is comparatively free from undesired hunting.

In accordance with the present invention, a control system comprises means for supplying a first electrical effect of adjustable magnitude, an input circuit adapted to have applied thereto a second electrical effect, and another input circuit adapted to have applied thereto a third electrical effect having a magnitude which varies in a predetermined manner over a range of magnitudes including the magnitudes of both the first and the second electrical effects. The control system also includes means including a first signal-translating channel responsive to the third electrical effect when the magnitude thereof exceeds that of the first electrical effect for deriving a first control signal. The system further includes means including a second signal-translating channel responsive to the third electrical effect when the magnitude thereof exceeds that of the second electrical effect for deriving a second control signal. The control system additionally includes means in the signal-translating channels responsive to the first and to the second control signals for deriving therefrom in an individual one of the signal-translating channels a control effect varying with the difference between the magnitudes of the first and the second electrical effects. The control system additionally includes means coupled to each of the channels and responsive to the control effect for developing an adjusting force varying with the aforesaid magnitude difference and for applying the adjusting force to the first-mentioned means to adjust the magnitude of the first electrical effect toward equality with that of the second electrical effect.

For a better understanding of the present invention, together with other and further objects thereof, reference is had to the following description taken in connection with the accompanying drawings, and its scope will be pointed out in the appended claims.

Figure 2:
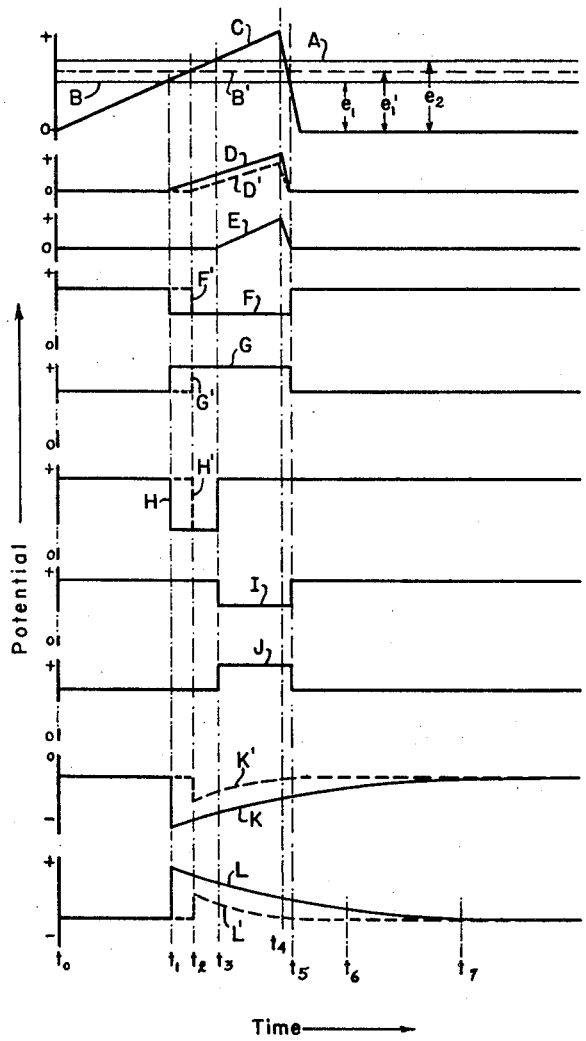
Figure 3:
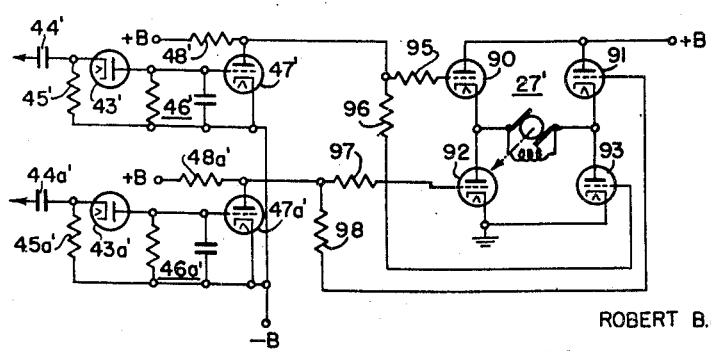

Referring now to the drawings, Fig. 1 is a circuit diagram, partly schematic, of a radiant-energy distance-measuring system which includes a control system embodying the present invention in a particular form; Fig. 2 comprises graphs utilized in explaining the operation of the control system of Fig. 1; and Fig. 3 represents a modified form of the invention.

Referring now more particularly to Fig. 1 of the drawings, the radiant-energy distance-measuring system there represented may be one of the type disclosed and claimed in applicant's copending application Serial No. 760,360, filed July 11, 1947, now Patent No. 2,491,029, entitled "Pulse-signal translating system," and assigned to the same assignee as the present invention. This distance-measuring system includes an antenna system 10, 11 which is coupled to an interrogator-responser 12 of conventional construction, details of which are well known in the art so that a detailed description thereof is unnecessary. Briefly, however, the interrogator-responser includes a transmitter for transmitting wave-signal energy such as wave-signal pulses or interrogations to a distant object, for example an aircraft 13, the distance of which from the interrogator-responser 12 is to be measured. Unit 12 also includes a receiver for receiving related wave signals from the aircraft 13, which wave signals may comprise reflections or wave-signal pulses transmitted from suitable equipment on the aircraft in reply to the interrogations from unit 12. Interrogator-responser 12 is adapted to develop in an output circuit thereof a control effect, specifically a unidirectional output potential designated $e_2$, having a magnitude which is proportional to the round-trip propagation time and thus the distance between the unit 12 and the aircraft 13. The output circuit of the interrogator-responser is coupled to an input circuit of a control system 15 embodying the present invention, which system will be described in detail hereinafter.

Control system 15 includes means for supplying a first electrical effect or potential of adjustable magnitude. This means comprises a source 16 of unidirectional potential, such as a battery and a potentiometer 17. The source 16 is one which is capable of developing a substantially constant output voltage for application to the end terminals of the potentiometer 17. A potential of adjustable magnitude, designated $e_1$, is developed between the rotary arm 18 and a grounded terminal of the potentiometer 17. The control system also includes an input circuit adapted to have applied thereto a second electrical effect having a magnitude which may vary. This circuit, which may include a pair of terminals 20, 20 is coupled to the output circuit of the interrogator-responser 12 wherein there is developed the above-mentioned unidirectional potential $e_2$.

The control system 15 also includes another input circuit adapted to have applied thereto a third electrical effect having a magnitude which varies in a predetermined manner over a range of magnitudes including the magnitudes of both the first and the second potentials $e_1$ and $e_2$. This circuit, which may have a pair of terminals 21, 21, is connected to the output circuit of a periodic potential generator 22 preferably generating a periodic signal of saw-tooth wave form. The generator 22 thus develops an output potential having a value which periodically exceeds that of the unidirectional potentials $e_1$ and $e_2$ and varies linearly at a rate preferably substantially greater than any expected rate of variation of the potential $e_2$.

Control system 15 further includes means responsive to the third electrical potential for comparing the magnitudes of the potentials $e_1$ and $e_2$ to derive an adjusting force of value varying with the difference between the magnitudes of potentials $e_1$ and $e_2$. This means comprises a pair of signal-translating channels 30 and 50 and a reversible alternating-current motor 27 which is coupled to each of the channels in a manner more fully to be described hereinafter. Except for slight differences in their input circuits, the channels 30 and 50 are similar in construction and elements of channel 50 corresponding to like elements of channel 30 are designated by similar reference numerals with the subscript $a$.

The input circuit of channel 30 includes a rectifier device 31, the cathode of which is coupled through a resistor 23 to the high-potential one of the input-circuit terminals 20, 20, while the anode of the device 31 is connected to the high-potential one of the other input-circuit terminals 21, 21. In somewhat similar manner, the input circuit of the channel 50 includes a rectifier device 31a, the cathode of which is coupled through a resistor 23a to the rotary arm 18 of the potentiometer 17 while the anode of the device 31a is connected in common with the anode of the rectifier device 31 to the high-potential one of the input-circuit terminals 21, 21.

Channel 30 also includes means responsive to the periodic potential of the generator 22 when the magnitude thereof has a predetermined relationship with respect to the magnitude of the potential $e_2$, namely when the magnitude of the periodic potential exceeds the magnitude of the potential $e_2$, for deriving a control signal. This means comprises a conventional electron-tube switch 32, the control electrode of which is coupled to the cathode of the rectifier device 31 through a coupling condenser 33 and is coupled to ground through a resistor 34. Operating potentials for the tube 32 are supplied from the sources indicated as $+B$ and $+S_c'$ in a conventional manner. A cathode resistor 35, which is coupled to the source $+S_c$ through a voltage-dropping resistor 36, is effective to develop a bias potential of such value as normally to maintain the tube 32 in a nonconducting state. Channel 50 includes a similarly arranged electron-tube switch 32a for deriving in similar manner a second control signal when the magnitude of the periodic potential of generator 22 exceeds the magnitude of the potential $e_1$.

The signal-translating channels 30 and 50 also include therein means responsive to the control signals derived by the electron-tube switches 32 and 32a for deriving therefrom in a selected one of the signal-translating channels a control effect varying with the difference between the magnitudes of the potentials $e_1$ and $e_2$. This means comprises an electron-tube switching means in the form of a pentode 37 in the signal-translating channel 30 and a pentode 37a in the signal-translating channel 50. The control electrodes of the pentodes 37 and 37a are connected directly to the anodes of the respective electron-tube switches 32 and 32a. The anodes of pentodes 37 and 37a are energized from a source of potential, indicated as $+B$, through respective resistors 38 and 38a. The cathodes of these tubes are connected to a somewhat lower potential source, indicated as $+B'$. The screen electrodes of the pentodes 37 and 37a are connected to a potential source, indicated as +Sc, through respective resistors 39 and 39a. The suppressor electrodes of pentodes 37 and 37a are connected to the +B' source through respective resistors 40 and 40a, and are connected to ground through respective resistors 41 and 41a. The potentials which are applied to the screen electrodes of the pentodes 37 and 37a are of such magnitude that screen current normally flows therein. However, the suppressor electrodes of these tubes are biased less positively than their cathodes, so that the flow of anode current through the pentodes is normally prevented. The screen electrode of the pentode 37 is coupled to the suppressor electrode of the pentode 37a through a coupling condenser 42 while the screen electrode of the pentode 37a is similarly coupled to the suppressor electrode of pentode 37 through a coupling condenser 42a for a purpose to be explained subsequently.

The anode of the pentode 37 is coupled to the cathode of a diode rectifier device 43 through a coupling condenser 44. Connected between the anode and the cathode of the device 43 is a resistor 45 in series with a resistor-condenser network 46. The network 46 is connected between the input electrodes of a direct-current amplifier 47. The cathode of the latter is connected to a negative potential source, indicated as —B, and its anode is coupled to ground through a resistor 48. The amplifier 47 is normally conductive.

The anode of the amplifier 47, in turn, is connected to the control electrode of an electron tube 49, which is preferably of the gas-filled type to provide a relatively large current flow therethrough when conductive. The cathode of the tube 49 is grounded and its anode is connected to an individual end terminal of a center-tapped secondary winding 70 of an energizing transformer 71. The center tap of the winding 70 is connected to each of the shield electrodes of the tubes 49 and 49a and is connected to ground through a first field winding 73 of the reversible alternating-current motor 27. The motor 27 is a split-phase induction motor and has a second field winding 74, disposed in spaced quadrature relation with respect to the winding 73, which is coupled through a phase-splitting condenser 76 to a power-supply input circuit comprising input terminals 77, 77. The primary winding 75 of the energizing transformer 71 is likewise coupled to the power-supply circuit which is adapted to have applied thereto energizing potentials from a source 69.

The rotor of the motor 27 is mechanically coupled, as indicated by the broken line 78, to the rotary arm 18 of the potentiometer 17 for the purpose of adjusting the magnitude of the potential $e_1$ to equality with that of the potential $e_2$ in a manner to be explained subsequently. The control system 15 also includes means coupled to the potentiometer 17 for indicating the magnitude of the potential $e_2$ when the potential $e_1$ is adjusted to equality therewith. This means comprises an indicator 85 having a suitable fixed scale 86, and a rotatable pointer 87 is mechanically coupled to the rotary arm 18 of the potentiometer 17 by a suitable driving connection represented by a broken line 88.

Considering now the operation of the distance-measuring system and the control system 15 just described, and referring to the curves of Fig. 2, a wave-signal pulse or interrogation is transmitted by the interrogator-responser 12 to the aircraft 13 and a reply signal is transmitted or returned thereby. This signal is intercepted by the antenna system 10, 11 and there is developed in the output circuit of unit 12 a unidirectional potential $e_2$ having a magnitude which is proportional to the distance between unit 12 and the aircraft 13. An assumed value of this potential is represented by the horizontal curve A of Fig. 2. It will further be assumed that the position of the rotary arm 18 of the potentiometer 17 is such at this time that the unidirectional potential $e_1$, represented by the horizontal curve B of Fig. 2, between the arm and ground is somewhat less than the output potential $e_2$ of unit 12. It will also be assumed that a cycle of the operation starts at time $t_0$ when the rectifier devices 31 and 31a are in a nonconductive state due to the application to the cathodes thereof of the positive potentials $e_1$ and $e_2$.

The periodic potential generator 22 applies to the terminals 21, 21 of unit 15 a signal of saw-tooth wave form which varies over a range of magnitudes including the magnitudes of the unidirectional potentials $e_1$ and $e_2$, as represented by curve C. Under the assumed conditions mentioned above, at time $t_1$ the magnitude of the saw-tooth potential applied to the anode of the rectifier device 31a equals and then exceeds the potential $e_1$ serving as a positive bias on the cathode of the rectifier device 31a. The latter then conducts and during the interval $t_1$–$t_5$ there is developed across the resistor 23a a voltage having the wave form represented by curve D. At the time $t_3$ the potential applied to the anode of the rectifier device 31 from the generator 22 begins to exceed the bias potential $e_2$ applied to the cathode of the rectifier device 31. Thereafter the latter becomes conductive and the potential developed across the resistor 23 during the period $t_3$–$t_5$ has the wave form represented by curve E.

The potential developed across the resistor 23a, and represented by curve D, is translated by the condenser 33a to the control electrode of the electron-tube switch 32a and is effective to overcome the bias applied to the control electrode of the latter by the cathode resistor 35a. As a result there is developed in the output circuit of switch 32a at time $t_1$ a control signal having a negative pulse wave form, as represented by curve F. This control signal, the pulse of which terminates at approximately time $t_5$, is applied to the control electrode of the pentode 37a and each pulse thereof is effective to reduce the flow of screen current. Consequently, the screen electrode potential of the pentode 37a is of positive pulse wave form, as represented by curve G, and is applied as a positive pulse control signal through the coupling condenser 42a to the suppressor electrode of the pentode 37. This permits anode current to flow through the latter and, accordingly, the anode potential of tube 37 decreases at time $t_1$, as represented by curve H.

At time $t_3$ the potential developed across the resistor 23 overcomes the bias on the control electrode of the switch 32 and the latter becomes conductive. A control signal of negative pulse wave form is therefore produced at the anode of switch 32, each pulse of which under the assumed conditions, has an approximate duration $t_3$–$t_5$, as represented by curve I. This control signal is applied to the control electrode of the pentode 37. Since each pulse of the signal is negative, it is effective to terminate in pentode 37 the flow of space current earlier initiated therein at time $t_1$ by the pulse applied to its suppressor electrode from tube 37a. As a result, the anode potential of the pentode 37 increases at time $t_3$ to have the wave form represented by curve H. The screen potential of tube 37 also increases, as represented by curve J. Accordingly, a signal of positive pulse wave form is applied to the suppressor electrode of the pentode 37a, but this is ineffective to cause any flow of anode current in this tube due to the high negative bias applied during the interval $t_1$–$t_5$ to the control electrode of the pentode 37a from the preceding tube 32a. Under these assumed conditions, therefore, an output signal is not developed at the anode of the pentode 37a during the interval $t_1$–$t_5$. At time $t_5$ the control-signal pulses applied to the control electrodes of the pentodes 37 and 37a terminate, thus enabling each tube to return to its original status.

The negative output pulse from the anode of the pentode 37 is applied through the coupling condenser 44 to the diode rectifier device 43. This pulse renders the device 43 conductive and develops across the network 46 a negative control potential having the wave form represented by curve K. This control potential biases the direct-current amplifier 47 beyond anode-current cutoff and develops in the output circuit thereof an amplified positive control potential having the wave form represented by curve L. The amplitude of the control potential decreases exponentially as the charge on the network 46 diminishes in well-known manner at a rate determined by the time constant of the network. At time $t_7$ the direct-current amplifier 47 again becomes conductive and the channel 30 is restored to its initial condition.

Alternating-potential energy from the source 69 is applied to the anode-cathode electrodes of the electron tubes 49 and 49a through the motor field winding 73 from individual halves of the center-tapped secondary winding 70 of the transformer 71. The application of the positive control potential from the output circuit of the direct-current amplifier 47 to the input circuit of the gas-filled electron tube 49 is effective to overcome the bias on the latter afforded by the potential drop across the resistor 48, thereby rendering the tube 49 conductive at time $t_1$. This produces a relatively large current flow through the winding 73, the phase thereof with reference to that flowing through the other winding 74 of the motor being such that a rotating magnetic field is produced which is effective to turn the rotor of the motor 27 in a clockwise direction. This turns the rotary arm 18 of the potentiometer 17 in a clockwise direction and adjusts the magnitude of the potential $e_1$ toward equality with that of the potential $e_2$. At approximately time $t_7$ the electron tube 49 ceases to conduct and becomes deionized so that the flow of energy to the winding 73 of the motor ceases.

A predetermined time after time $t_7$, depending upon the periodicity of the periodic potential generator 22, another saw-tooth current corresponding to that represented by curve C of Fig. 2 is applied by the generator 22 to the terminals 21, 21 whereupon the operation described above is repeated, assuming of course that the potential $e_1$ is still less than $e_2$. This operation continues, with the winding 73 of the motor 27 being supplied with successive pulses of energy, until the motor has rotated sufficiently to adjust the potential $e_1$ to equality with the potential $e_2$. However, as the aforesaid potential difference diminishes, the energy content of the successive pulses which are applied to the winding 73 of the motor decreases and the adjusting force developed by the motor 27 in response thereto also decreases correspondingly.

In practice the adjusting force supplied by the motor 27 to the potentiometer 17 varies with the difference between the magnitudes of the potentials $e_1$ and $e_2$. This may be demonstrated conveniently by reference to the several broken-line curves of Fig. 2. Let it now be assumed that at time $t_0$ the previously assumed conditions in the control system 15 prevail with the exception that the potentiometer 17 has been so adjusted that there is now applied to the channel 50 from the potentiometer a potential $e_1'$, represented by the broken-line curve B' of Fig. 2, greater than the potential $e_1$ but still less than the potential $e_2$. This condition could exist, for example, after an initial adjustment of the potentiometer 17 by the motor 27 in a direction to reduce the potential difference between the voltages $e_1$ and $e_2$. From the previous explanation it will be manifest, therefore, that the rectifier device 31a will become conductive only at time $t_2$, thereby applying a potential having the wave form shown by broken-line curve D' to the control electrode of the electron-tube switch 32a. The potential which is applied to the control electrode of the electron-tube switch 32, however, will have the wave form represented by curve E and will render the switch 32 conductive at time $t_3$. In a manner similar to that previously described, control signals having the wave forms represented by the broken-line curve F' and the full-line curve I will be applied to the control electrodes of the respective pentodes 37a and 37. The signal applied to the screen electrode of pentode 37 at time $t_2$ will appear as shown by the broken-line curve G', and the output signal from the anode of the pentode 37 will have the wave form represented by the broken-line curve H'. The output signal of the devices 43 and 47 will therefore be as represented by the respective broken-line curves K' and L'.

It will be seen from the above-mentioned curves, particularly the curves L and L', that the energy which is applied to the winding 73 of the motor 27 becomes less as the difference between the potentials $e_1$ and $e_2$ is reduced. Accordingly, the adjusting force developed by the motor for application to the potentiometer 17 is also less. It will also be clear that this adjusting force varies directly with the difference between the magnitudes of the potentials $e_1$ and $e_2$. Consequently, the motor 27 does not tend to overrun the position which maintains the adjustment of the potentiometer 17 at a point of balance, thereby preventing undesired hunting.

It will be clear that a similar operation results when the potential $e_1$ is greater than the potential $e_2$. In this case the rectifier device 31 first becomes conductive and the pentode 37a, rather than the pentode 37, produces an anode output signal. This signal is applied to the diode rectifier device 43a and the output signal of the latter is amplified by the amplifier 47a. The output signal of the amplifier 47a renders the electron tube 49a conductive and causes a flow of current through the winding 73. Since the anodes of the tubes 49 and 49a are connected to opposite terminals of the secondary winding 70 of the transformer 71, the current which flows through winding 73, when the electron tube 49a is conductive, is of such phase with respect to that in the winding 74 that the armature of the motor 27 rotates in a counterclockwise direction. The adjusting force developed by the motor 27 turns the rotary arm 18 of the potentiometer 17 counterclockwise and reduces the magnitude of the potential $e_1$. Successive pulses of energy, which diminish in value as the magnitude of the potential $e_1$ approaches that of the potential $e_2$, are applied to the winding 73 of the motor 27. These pulses, in conjunction with the energy applied to the motor winding 74, actuate the motor and are effective quickly to adjust the magnitude of the potential $e_1$ to equality with the potential $e_2$.

While the operation of the control system 15 has been explained in connection with a constant value of output potential $e_2$ from the unit 12, it will be apparent that the system is equally effective to adjust the magnitude of the potential $e_1$ to equality with a potential $e_2$ which may have a variable magnitude, so long as the rate of variation of the potential $e_2$ is substantially less than the periodicity of the potential applied to the terminals 21, 21.

From the foregoing description of the control system 15, it will be seen that the pentodes 37 and 37a comprise, in the signal-translating channels 30 and 50, electron-tube switching means responsive to the leading edges of the control signals from the electron tubes 32 and 32a for deriving therefrom in a selected one of the channels a control effect varying with the difference between the magnitudes of the electrical potentials $e_1$ and $e_2$.

While application does not intend to be limited to any particular circuit design, there follows a tabulation of design information which has been found to be useful in practicing the invention:

| | |
|---|---|
| Resistors 34, 34a, 36, 36a, 38, and 38a | 1 megohm |
| Resistors 35 and 35a | 33 kilohms |
| Resistors 39 and 39a | 22 kilohms |
| Resistors 23, 23a, 40, 40a, 41, 41a, 45, and 45a | 470 kilohms |
| Resistors 48 and 48a | 47 kilohms |
| Potentiometer 17 | 30,000 ohms (max.) |
| Networks 46 and 46a | 3.3 megohms 0.01 microfarad |
| Condensers 33, 33a, 42, and 42a | 1,000 micromicrofarads |
| Condensers 44 and 44a | 0.01 microfarad |
| Tubes 31 and 31a; 43 and 43a | 6AL5 duplex diode |
| Tubes 32 and 32a | 6AG5 |
| Tubes 37 and 37a | 6AS6 |
| Tubes 47 and 47a | 6J6 duplex triode |
| Tubes 49 and 49a | 2D21 |
| Source 16, +B, +Sc | 200 volts |
| +B', +Sc' | 75 volts |
| −B | −40 volts |
| Source 69 | 35 volts, 400 cycles |
| Periodic potential of generator 22 | 0–150 volts |
| Repetition rate | 40 sweeps per second |
| Motor 27 | 35 volts, split phase |

Referring now to Fig. 3 of the drawings, there is represented schematically a portion of a control system embodying a modified form of the present invention. This portion is generally similar to the corresponding portion of the Fig. 1 control system represented to the right of the condensers 44 and 44a in Fig. 1. Accordingly, corresponding elements of the Fig. 3 arrangement will be designated by the same reference numerals primed. The anodes of the direct-current amplifiers 47' and 47a' are connected to a source of potential, indicated as +B, through respective resistors 48' and 48a'. The operating potentials applied thereto are such that these amplifiers are normally conductive and the anodes thereof are normally at approximately ground potential as a result thereof.

Instead of employing an alternating-current motor as in the control system of Fig. 1, a direct-current motor 27' is employed to operate the potentiometer. A source of potential, indicated as +B, is connected to one of the terminals of the motor 27' through the anode-cathode path of an electrode switching tube 90 and is similarly connected to the other terminal thereof through a similar electronic switching tube 91. The first-mentioned terminal is adapted to be connected to ground through the anode-cathode path of an electronic switching tube 92 and the second-mentioned terminal is similarly adapted to be connected to ground through an electronic switching tube 93. The anode of the amplifier 47' is connected to the control electrode of the tube 90 through a resistor 95 and to the control electrode of tube 93 through a resistor 96. Similarly, the anode of amplifier 47a' is connected to the control electrodes of tubes 92 and 91 through resistors 97 and 98, respectively. The values of the resistors 96 and 97 are considerably larger than the values of the resistors 95 and 98 for reasons to be explained hereinafter. The potentials applied to the tubes 90–93, inclusive, are such that these tubes are normally maintained in a nonconducting state.

Considering briefly the operation of the Fig. 3 arrangement, the application of a negative control signal to one of the diode rectifier devices, for example device 43', renders it conductive and develops a negative signal on the control electrode of the direct-current amplifier 47'. This biases the amplifier 47' to cutoff and applies a positive signal to the control electrode of the electronic switching tubes 90 and 93, thus causing tubes 90 and 93 to become conductive. The resistors 95 and 96 limit the value of the grid current which may flow in tubes 90 and 93 to a reasonable value. Resistor 96 maintains the magnitude of the potential applied to the control electrode of tube 93 at a value which permits a conductive path to be established from the source +B to ground through the space-current path of tube 90, the motor 27', and the space-current path of the tube 93. Motor 27' thereupon develops an adjusting force of the proper direction or sense to bring the two potentials $e_1$ and $e_2$ mentioned previously to equality, whereupon the tubes in the actuated signal-translating channel are restored to their normal operating conditions. The motor 27 is rotated in the opposite direction when the tubes 91 and 92 are rendered conductive by control signals derived from the diode rectifier device 43a' and the direct-current amplifier 47a'.

The Fig. 3 arrangement is useful for those installations wherein a source of alternating-current power may not be available, as on most aircraft. A direct-current motor is sometimes more desirable for those applications wherein a rather high starting torque is important, for example on aircraft which may be required to operate at high altitudes, or in cold climates. At the higher altitudes and in the colder regions, the increased viscosity of bearing lubricants may make it necessary to employ a driving motor having a rather high starting torque.

While the operation of the control system has been explained in connection with the application of a voltage of saw-tooth wave form applied to the input terminals 21, 21, it will be manifest that other periodic voltages, for example sinusoidal voltages, may be employed as long as the magnitude thereof periodically exceeds that of the potentials $e_1$ and $e_2$.

It will be apparent from the foregoing description that a control system embodying the present invention is comparatively free from undesired hunting and is therefore capable of providing a quick and accurate adjustment of the magnitude of a first potential to equality with that of the second electrical potential.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A control system comprising: means for supplying a first electrical effect of adjustable magnitude; an input circuit adapted to have applied thereto a second electrical effect; an input circuit adapted to have applied thereto a third electrical effect having a magnitude which varies in a predetermined manner over a range of magnitudes including the magnitudes of both said first and said second electrical effects; means including a first signal-translating channel responsive to said third electrical effect when the magnitude thereof exceeds that of said first electrical effect for deriving a first control signal; means including a second signal-translating channel responsive to said third electrical effect when the magnitude thereof exceeds that of said second electrical effect for deriving a second control signal; means in said signal-translating channels responsive to said first and to said second control signals for deriving therefrom in an individual one of said signal-translating channels a control effect varying with the difference between the magnitudes of said first and said second electrical effects; and means coupled to each of said channels and responsive to said control effect for developing an adjusting force varying with said magnitude difference and for applying said adjusting force to said first-mentioned means to adjust the magnitude of said first electrical effect toward equality with that of said second electrical effect.

2. A control system comprising: means for supplying a first electrical effect of adjustable magnitude; an input circuit adapted to have applied thereto a second electrical effect; an input circuit adapted to have applied thereto a third electrical effect having a magnitude which varies in a predetermined manner over a range of magnitudes including the magnitudes of both said first and said second electrical effects; means including a first signal-translating channel responsive to said third electrical effect when the magnitude thereof exceeds that of said first electrical effect for deriving a first control signal of pulse wave form; means including a second signal-translating channel responsive to said third electrical effect when the magnitude thereof exceeds that of said second electrical effect for deriving a second control signal of pulse wave form; electron-tube switching means in said signal-translating channels and responsive to the leading edges of said first and second control signals for deriving therefrom in a selected one of said signal-translating channels a control effect varying with the difference between the magnitudes of said first and said second electrical effects; and means coupled to each of said channels and responsive to said control effect for developing an adjusting force varying with said magnitude difference and for applying said adjusting force to said first-mentioned means to adjust the magnitude of said first electrical effect toward equality with that of said second electrical effect.

ROBERT B. J. BRUNN.

REFERENCES CITED

The following references are of record in the file of this patent:

UNITED STATES PATENTS

| Number | Name | Date |
| --- | --- | --- |
| 2,275,317 | Ryder | Mar. 3, 1942 |
| 2,376,599 | Jones | May 22, 1945 |
| 2,435,965 | Hartig | Feb. 17, 1948 |
| 2,435,966 | Isserstedt | Feb. 17, 1948 |